(12) United States Patent
Fournier et al.

(10) Patent No.: US 11,556,959 B2
(45) Date of Patent: Jan. 17, 2023

(54) INTERNET DATA USAGE CONTROL SYSTEM

(71) Applicant: Portable Data Corp, Oakland, CA (US)

(72) Inventors: James Fournier, Oakland, CA (US); Victor Grey, Oakland, CA (US)

(73) Assignee: Portable Data Corp, Oakland, CA (US)

(*) Notice: Subject to any disclaimer, the term of this patent is extended or adjusted under 35 U.S.C. 154(b) by 58 days.

(21) Appl. No.: 16/900,971

(22) Filed: Jun. 14, 2020

(65) Prior Publication Data

US 2021/0390585 A1 Dec. 16, 2021
US 2022/0108355 A9 Apr. 7, 2022

Related U.S. Application Data

(63) Continuation-in-part of application No. 16/772,793, filed as application No. PCT/US2018/052089 on Sep. 20, 2018.

(Continued)

(51) Int. Cl.
   *G06Q 30/02* (2012.01)
   *G06F 16/958* (2019.01)
   *H04L 9/32* (2006.01)

(52) U.S. Cl.
   CPC ....... *G06Q 30/0269* (2013.01); *G06F 16/958* (2019.01); *H04L 9/3247* (2013.01)

(58) Field of Classification Search
   CPC .............. G06Q 30/0269; G06F 16/958; H04L 9/3247
   See application file for complete search history.

(56) References Cited

U.S. PATENT DOCUMENTS 8,316,237 B1 * 11/2012 Felsher ................. H04L 9/0825 713/171
8,572,083 B1 * 10/2013 Snell ..................... G06F 16/287 707/736

(Continued)

FOREIGN PATENT DOCUMENTS

| WO | 2017/147692 | 9/2017 | |
| WO | 2019/070419 | 4/2019 | |
| WO | WO-2019075156 A1 * | 4/2019 | ......... H04L 63/0869 |

OTHER PUBLICATIONS

"Hash Function," Published online by Wikipedia at least as early as May 30, 2020, available online at https://en.wikipedia.org/w/index.php?title=Hash_function&oldid=959841170, retrieved and last visited Jun. 16, 2022.

*Primary Examiner* — Scott C Anderson
(74) *Attorney, Agent, or Firm* — David R. Stevens; Stevens Law Group

(57) ABSTRACT

A method for seamlessly and automatically granting tailored permission for use and transference of internet data between databases with comprehensive consent is described. The method employs a graph language such as JSON-LD to integrate and employ cryptographically signed Information Sharing Agreements (ISA) between parties. Data is serialized to be easily transferred between databases when appropriate permission is obtained. Granular data exchange under usage control contacts can be automated among any number of parties on the internet. As such, the method provides a means by which users may control not only what may be done with their data, but to what entity or entities the data may be transferred. Advertisements may then be served to the user according to his or her preferences as defined within a web or desktop app, which is then applied to all related ad publishers publishing to the domains visited by the user.

27 Claims, 7 Drawing Sheets

Related U.S. Application Data

(60) Provisional application No. 62/589,334, filed on Nov. 21, 2017, provisional application No. 62/560,714, filed on Sep. 20, 2017.

(56) References Cited

U.S. PATENT DOCUMENTS

| | | | |
|---|---|---|---|
| 8,688,992 B2* | 4/2014 | Daniels | H04L 9/3247 |
| | | | 713/176 |
| 8,849,716 B1* | 9/2014 | Everhart | H04L 63/10 |
| | | | 705/51 |
| 9,646,323 B2* | 5/2017 | Hull | G06Q 30/0269 |
| 9,779,452 B1* | 10/2017 | Medina | G06K 9/78 |
| 2005/0182773 A1 | 8/2005 | Feinsmith | |
| 2006/0219776 A1* | 10/2006 | Finn | G06K 19/07732 |
| | | | 235/380 |
| 2012/0278251 A1* | 11/2012 | Pinsker | G06Q 10/103 |
| | | | 705/342 |
| 2013/0041755 A1 | 2/2013 | Ivanov | |
| 2016/0036861 A1* | 2/2016 | Mattes | H04L 63/20 |
| | | | 726/1 |
| 2016/0300223 A1* | 10/2016 | Grey | G06F 21/6245 |
| 2017/0109759 A1* | 4/2017 | Korb | G06Q 30/018 |
| 2017/0206523 A1* | 7/2017 | Goeringer | G06Q 20/409 |
| 2019/0188701 A1 | 6/2019 | Parsons et al. | |
| 2020/0058023 A1 | 2/2020 | Travizano et al. | |
| 2020/0084051 A1 | 3/2020 | Bessonov et al. | |

\* cited by examiner

INTERNET DATA USAGE CONTROL SYSTEM

CONTINUITY

The present invention is a CIP of patent application Ser. No. 16/772,793, filed on Jun. 14, 2020, which is a US National Stage Application of PCT/US2018/052089 filed on Sep. 20, 2018, which in turn claims priority to U.S. provisional patent application No. 62/560,714 filed on Sep. 20, 2017, and that same PCT application claims priority to U.S. provisional patent application No. 62/589,334 filed on Nov. 21, 2017.

FIELD OF THE PRESENT INVENTION

The present invention relates to Internet data, and more specifically relates to permissioned data exchange among parties over the internet.

BACKGROUND OF THE PRESENT INVENTION

Data sharing and transfers via networks are ubiquitous in our modern computerized society. Many individuals, groups, companies, organizations, and the like routinely not only share digital data about themselves and things that they know, but also search for data and information about other parties and other things across closed networks, multiple networks, and the Internet. In general, data portability refers to the possibility for a user to have its data moved from one data host to another. Such a user can be an individual, company, or other party, and the user data can be moved by the user itself, or the user can grant permission to another party or entity to move or receive the data or ongoing currently updated copies of the data, such as by a link. Such data hosts can be on a single network, or can be across disparate networks and even the Internet in general. Such data can include data that has been self-created and/or data that has been created about the user as a result of its activities or other information storage.

Data portability can be important with respect to a user, a vendor, and/or other party wishing to obtain or exchange identifying or other pertinent information, such as for a potential purchase or other commercial transaction/exchange. Of course, there can be many drawbacks to the unlimited availability and exchange of identifying or other personal information, and few people are willing to provide their own personal data in a wide open and unrestricted manner. There are almost always requirements, restrictions, or other protections that go along with providing such personal data, as is generally well known.

While the exchange of identifying or other personal data can often be kept under control or restricted when it takes place within a single controlled network or domain, it can be problematic to provide for data portability across multiple disparate servers, networks, or the Internet in general. For example, where a user might wish to obtain information about a particular product, he or she might provide his or her personal information or data on a proprietary web site or single network of a known vendor for that type of product, where it might be reasonably expected that such information can be kept safe or protected by a reputable operator of the single website or network. Constantly and repeatedly providing personal information or data can be cumbersome and inefficient though, such as where a user might wish to provide and/or access data from multiple providers, networks, or sites.

In fact, it has become increasingly common simply to provide personal data over the Internet in general, sometimes in ways that are not well secured or protected. The Internet has become the common network connecting many other types of digital networks and devices for communications and data interchange. The increased use of the Internet has led to an increase in the number of applications and services running thereon, the number and value of transactions taking place, and the number and types of relationships that can be formed and maintained electronically. Each of these has in turn increased the importance of trust in online activities. Although a number of known technologies and services have been developed to meet this need, there tends to be drawbacks or limitations to each of that which is currently known.

Presently, there is no automated way to control the use of data after it has been transmitted from one computing device to another computing device, or from one database to another database, using the Internet or other network. There is presently no automated way to verify the chain of custody, or provenance, for data received using the Internet. Additionally, there is presently no protocol available which reconciles and harmonizes the PSD2 regulation and GDPR regulations.

Thus, there is a need for a new system and method by which an entity's data may be controlled, and use of the data may be restricted by originator of the data securely and automatically according to preferences established by the entity. Additionally, there is a need for a methodized system which employs cryptographically signed, automated agreements between parties, users, or entities for the use and transference of data with full transparency. Such a system provides for a clear chain-of-custody of one's internet data, and enables users to restrict certain forms of usage and/or transference/sharing. The system is preferably configured to define and describe data so as to facilitate the movement of data from one database to another easily. The system and method preferably employs an existing graph language, and existing PKI—public/private key pairs. Additionally, such a system is preferably architected with a separation of concerns—i.e. roles and points on the system have been separated, which then interact with each other, rather than placing everything within a single server or hub such as a walled garden.

At least one previous attempt at creating a graph based user-controlled internet data exchange system has been unsuccessful. XDI aspired to provide built-in data access control via a data graph. However, the effort never achieved a working solution to that objective. XDI was at once over-determined, inefficient and cumbersome as a graph language, and ultimately failed to work because it was not database friendly. Data could not easily be defined so as to facilitate transfer between databases. XDI named, but never functionally defined a "link contract" in a meaningful way for developers. In contrast to XDI, the present invention currently employs JSON-LD as an underlying graph language and then goes on to actually define, create and manage link contracts. This allows the present inventions to facilitate data usage control by users with respect to the data that they share, and to govern how, where, and for what purposes, that obtained data may be used by a recipient via user-defined and mutually agreed permissions.

Additionally, there is a need for a system and protocol that is compatible and compliant with both GDPR and PSD2.

The spirit of the European Union General Data Protection Regulation (GDPR) is to empower end-users in their relations with corporations. The JLINC® protocol takes this literally, placing the data subject (the data rights holder) at the center of every data event. As Lawrence Lessig has stated, "code is law" and the JLINC® protocol of the present invention embodies the spirit of the GDPR in the structure of the protocol.

Another European regulation, the Payment Services Directive 2 (PSD2) requires banks to make it easier for financial services to access customer's banking services. This might seem to be in contradiction to the GDPR regulations, but it is believed that by placing the data rights holder at the center of each data event, the system of the present invention makes it possible to satisfy the intent and the text of both regulations.

The present invention builds on previous ideas including capability-based security, especially the work of computer scientist Mark Miller, an influential article entitled *The Strength of Weak Ties* by sociologist Mark Granovetter, the *Augmented Social Network* whitepaper from a group of two dozen professionals in the fields of digital communications, environmental activism, independent media, and socially responsible investment, and *Chain-Link Confidentiality* by professor of law and computer science Woodrow Hartzog.

Granovetter pointed out that a social network consisting only of strong ties is an isolated network. Nobody can be introduced to a new connection since everyone likely already knows everyone else. It is the weak ties—acquaintances or people who have met in passing—who provide bridges between social networks, making introductions for people who otherwise would not have met.

Miller and his co-authors saw this as a way to explain some of the power of capability-based computer systems. Miller says that "In a capability system, only connectivity begets connectivity. In a capability system, an object's authority to affect the world outside itself is determined solely by what references it holds, since the only way the object can cause an external effect is to send a message via one of these references. Consequently, the mechanics of reference-passing determine how authority can change over time."[1] He illustrated this with something he called a "Granovetter operator."

In FIG. 6, a diagram from Miller, the foo arrow is a "Granovetter operator" transmitting a capability from Alice to Bob giving him access to Carol. This illustrates connectivity begetting connectivity, as Alice transmits some subset of her ability to connect to Carol over to Bob.

Some of the advantages of such a system are that the capability transferred can be as granular as desired, and that no overarching system of identity is required. It is enough that Alice knows both Bob and Carol and no central authority need be invoked.

Another aspect of capability systems is that because capabilities can carry purpose information, they can enable "least authority" systems, in which only the minimum necessary information for a given purpose is released. Again from Miller, "Capability systems provide support for the precise, minimal, and meaningful delegation of authority, which is fundamental to secure operation."

A major influence on the thinking that went into JLINC® was the Augmented Social Network whitepaper. The ASN embodied and extended the idealism that inspired the originators of the internet decades previously. It talked about interoperability between communities, brokered relationships, and the transitive nature of trust. Nevertheless, it was still decades ahead of its time as far as the realization of its vision was concerned. JLINC® makes important steps in that realization.

Finally, there's chain-link confidentiality. Although in fact JLINC® had been in development for several years before the inventors became aware of Professor Hartzog's work, his paper Chain-Link Confidentiality published in the Georgia Law Review in 2012 lays out the social and legal theory underlying JLINC®, which the inventors had correctly intuited. JLINC® ID can be understood as the technical invention that makes the implementation of chain-link confidentiality possible.

Chain-Link Confidentiality states the problem as "Generally, individuals lose control of their personal information once they disclose it on the Internet." And the solution, in essence, is stated as "A chain-link confidentiality regime would contractually link the disclosure of personal information to obligations to protect that information as it is disclosed downstream."

The paper makes the point that contractual confidentiality agreements are a stronger legal framework than the more nebulous notion of "privacy", as they create a fiduciary relationship between the originator of information and the downstream recipients. And further, that those agreements can be constructed so as to obligate a recipient to assure that any subsequent recipients become parties to the same agreement before any data is transmitted.

This is exactly what the JLINC® protocol means by a "Standard Information Sharing Agreement" or SISA. JLINC® is the means whereby parties can agree to a SISA in an accountable, auditable, non-repudiable, cryptographically secure fashion, and subsequently have an ongoing exchange of information in the context of the agreed SISA, in the same accountable, auditable, non-repudiable, cryptographically secure fashion.

There is a problem. Capability systems were originally conceived as running in the context of a computer operating system whose code enforced the rules, or in a closely networked system all operating under the same coding paradigm. As Lawrence Lessig has stated, "code is law," meaning that however the code in a computer system is constructed determines what is possible or not possible in that system. He is using "law" in the sense of a law of physics rather than law in the legal sense.

Attempts to organize transactions using so called "smart contracts" have been tried, creating a contract as self-executing code. The problem here is that for practical purposes all code contains bugs. The action that the contract executes may, in some unforeseen circumstance, be very much not what the parties to the contract understood would happen. Correction and/or recourse may be problematic since the contract execution is self-evidently in accordance with the contract as coded, as well as irrevocable. One of the first large scale attempts at implementing a "smart contract" resulted in the loss of tens of millions of dollars for exactly this reason.

Attempting to create a capability system between entities over the unregulated public internet poses a problem, because once information is transmitted (i.e. copied) over the internet, the receiving entity is in possession of their copy of it under the control of their own system, and the sender has lost control over the information's usage by the receiver. Access control at the source of the information is in this sense futile—access can be denied but once it is granted all further control is lost.

Systems have been created to overcome the access problem by restricting the amount or nature of information accessible to that which the parties can agree is absolutely necessary, and no more. The most rigorous of these systems, known as zero-knowledge proofs, are mathematical methods used to verify things without sharing or revealing underlying data. For example, that you have enough money in your bank account to complete a transaction without revealing anything else about your balance.

This is not terribly useful however, when two or more parties wish to create an ongoing data stream between themselves containing many types of data (some of it unstructured or of an initially unforeseen nature) but still maintain a fiduciary control over its use. In other words, a confidential conversation.

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a method and system for establishing cryptographically signed agreements about data-use permission and data ownership between computing devices across the Internet. The agreement selection, signing and exchange may also be automated. Additionally, the present invention is a method for allowing two, or more, entities to exchange data in a manner that allows all parties to cryptographically sign agreed terms using the Internet, or other decentralized network for transport. The present invention uses a novel combination of existing standard protocols and methods to achieve the new objective of creating a decentralized data usage permission control mechanism.

The present invention provides a system and method by which users can not only control which entities may obtain their data when their data is desired by one or more entities, but also control what the entities are permitted do with that data after it has been transmitted or collected. The system involves a mutual signing of Information Sharing Agreements (ISAs), which are conventionally cryptographically signed. The contractual signing of the ISAs is facilitated via a robust, automated system primarily enacted using a graph language, such as JSON-LD. The agreements are legally valid, and are configured to strongly encourage entities to respect the agreements, or face reputation damage and/or legal ramifications.

The system is based on exchanging these ISAs, and the software facilitating the system of the present invention enables users to securely and confidently share data only after the permission and rights to use the data are negotiated and decided.

Most point-to-point data sharing on the internet, is done with some form of access control. Administrators control whether or not users may achieve access, or data may be exchanged. Currently, when data is exchanged, such as metadata, personal information, browsing information, and similar user data, possession is $9/10^{th}$ of the law. Once an entity has a user's internet data, he or she may do whatever they wish with it according to typical current terms of service. This is unfortunate for many common users of the internet, who do not know that their data is being captured, and have no way of knowing what will be done with it, or who it will be shared with. Once an entity has a user's data, they can do what they wish with it.

Today, graph languages such as JSON-LD make it far easier to move data between databases. The current invention adds agreements about how the data may be used, combined and how such activity may be automated, all in a way that can be cryptographically signed. This has a helpful side effect of helping to move data around between disparate data sources, as it is a common language and form in which to store the data. The system helps to prove what is done with the data, and at what date and time, thereby establishing data provenance. Additionally, the system allows one to prove that both parties agreed to this exchange. Part of the agreement preferably includes options such that the user may turn off any and all access to his/her data, and the other party is bound to comply with the request of the user. The user retains the ability to do this retroactively at any time and to receive a signed verified promise from the other party that they have complied and done so, where a cryptographic hash of the agreement, signed by all parties is held by all parties, and the signed hash is also recorded on the superset of all audit services or ledgers specified by any party.

The system of the present invention instantiates a data protection and exchange system that is secure, cryptographically signed, and automated, which allows the agreements about what can be done with one's data to be exchanged over the internet so as to govern that data after it is exchanged. This may also be applied to other agreements, including any type of commercial contract or agreements over the internet. Presently, data exchange can be automatically governed by so-called 'smart-contracts' such as on Ethereum, which are in practice black-boxes where code is obfuscated and as a result the outcome of the contract may only be known when that code is executed. This has resulted in situations where unexpected commercial transactions have occurred and value has been stolen due to software bugs, errors, or fraud. Where code cannot be readily understood, it may cause data to be shared without the user's knowledge, and to parties unknown to the user, or worse. It is an object of the present invention to move away from such ambiguous and obfuscated black-boxes, and provide to the user direct and transparent ongoing control over his or her own contractual agreements and data.

A distributed system (non-centralized), with user control disposed across multiple distributed systems is needed. Unlike Blockchain, the present invention offers a means by which data may be described with a graph language, such as JSON-LD, which effectively defines and maps the user data so as to allow seamless transfer of the data from one database to another.

In order to facilitate permissioned data exchange between entities, the data has to be described in a specific way in order to be moved successfully from one database to another. As such, the data must be serialized in order to do so. With a graph language, data can be moved between databases. However, many entities will not permit such exchanges without agreements in place about exactly which data may be exchanged, and what may be done with that data after it is moved. Specific data from databases may be shared with via a graph language, but this remains problematic in the absence of an automated agreement regarding what may be done with the data once acquired. The present invention provides a mechanism whereby that agreement is itself written in the graph language, and is expressed in a way that both computers and people may comprehend. The agreement can be signed with standard PKI, and once the agreement is transmitted, a link to the agreement is contained within an audit record of the agreement, so that both parties can show and any $3^{rd}$ party can irrefutably confirm that the agreement that they each hold was also signed by the other party and is valid.

The present invention, referenced as JLINC®, uses JSON-LD to express human and machine readable contracts governing what may be done with the data, and an audit trail is easily referenced and maintained within the transfer agreement itself, so that the entities may be held both legally responsible and accountable by reputation. Once companies (entities) sign a binding agreement that they can be held accountable for, both via reputation and legally, then they are much more likely to comply. Companies anywhere in the world that hold or process personal data for EU citizens can be penalized for noncompliance with GDPR by fines of up to 4% of global turnover.

Additionally, the system of the present invention is applicable to three-party interactions, and enables the data rights holder the capacity to maintain control over who has access to his/her data, as well as what may be done with the data after acquisition. The parties involved need not be limited to data holders, financial institutions, and companies, but may also include devices, businesses, and IOT devices manufactured by corporations.

It should be understood that the present invention is as follows:

JLINC® is a novel way to assemble methods, systems and techniques to provide confidentiality and to represent fiduciary relationships and accountability for parties sharing data over the global internet. It facilitates control over shared data, provenance of that data, and non-repudiation of data sharing actions. It makes use of modern standards such as JSON linked data, decentralized identifiers and verified credentials to accomplish these goals.

JLINC® offers a unique solution. The inventors realized that while a technical solution was possible, it was not possible for that solution to be purely technical. It consists of an innovative vision of a capability system, one that functions well on disparate systems running different kinds of code on dissimilar machines in separate organizations.

JLINC® is comprised of a key management system, an agreement management system, a communication protocol, and an auditing system, all assembled to work together in a new way to achieve the goal of a capability system that serves to make confidential exchanges between entities secure and provenance-preserving. It introduces a technical means to make fiduciary relationships between parties straightforward to create and audit.

In JLINC®, separate computer systems act as agents for entities, either individuals, organizations or other kinds of groups. An agent operates independently to represent the interests of its party to other entities via their agents. Each agent can create any number of entries on behalf of its user in an identity system that creates identifiers that point to the public part of public-private key-pairs. JLINC® in its current instantiations uses a method derived from a distributed identity standard called DID, but other suitable systems may arise in the future that would also be compatible with JLINC®.

JLINC® then provides methods for the parties being represented to select a mutually agreeable contract—a Standard Information Sharing Agreement or SISA—and to mutually cryptographically sign the selected agreement with their respective keys, each retaining a copy and optionally transmitting another copy to an audit service of their choosing. In its current instantiation JLINC® uses a standard data representation technique called JSON-LD, although other suitable representation systems may arise in the future that would also be compatible with JLINC®.

A SISA is a human-readable legally negotiable contract that at a minimum establishes a fiduciary confidentiality agreement between two parties. It requires each party to conform its use of any data transmitted via JLINC® from the other to the requirements as stated in the SISA. Such data may include a requirement to conform such use to the preferences of the user as they may change from time to time. These preferences are also transmitted via JLINC® as data.

Each data transmission is accompanied by a cryptographic hash of the SISA and signed by the transmitter and receiver, again each retaining a copy and optionally transmitting another copy to an audit service of their choosing. These are called SISA events and provide a non-refutable history of data and preference exchange under the SISA agreement.

SISAs may also be crafted to require a receiving party to only pass on data from the originator to other parties that also use JLINC® to agree to the same SISA, thus creating a chain-link confidentiality system.

In the event of a dispute of any kind, the issue may be adjudicated via traditional means, but using the audits of the SISAs and SISA events to establish a cryptographically and mathematically non-refutable history of the facts of the exchanges and agreements between the various parties.

For some use cases a verified credential may be required. JLINC® currently uses the Verified Credential standard published by the W3C, but other suitable mechanisms that accomplish the same task may be substituted.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
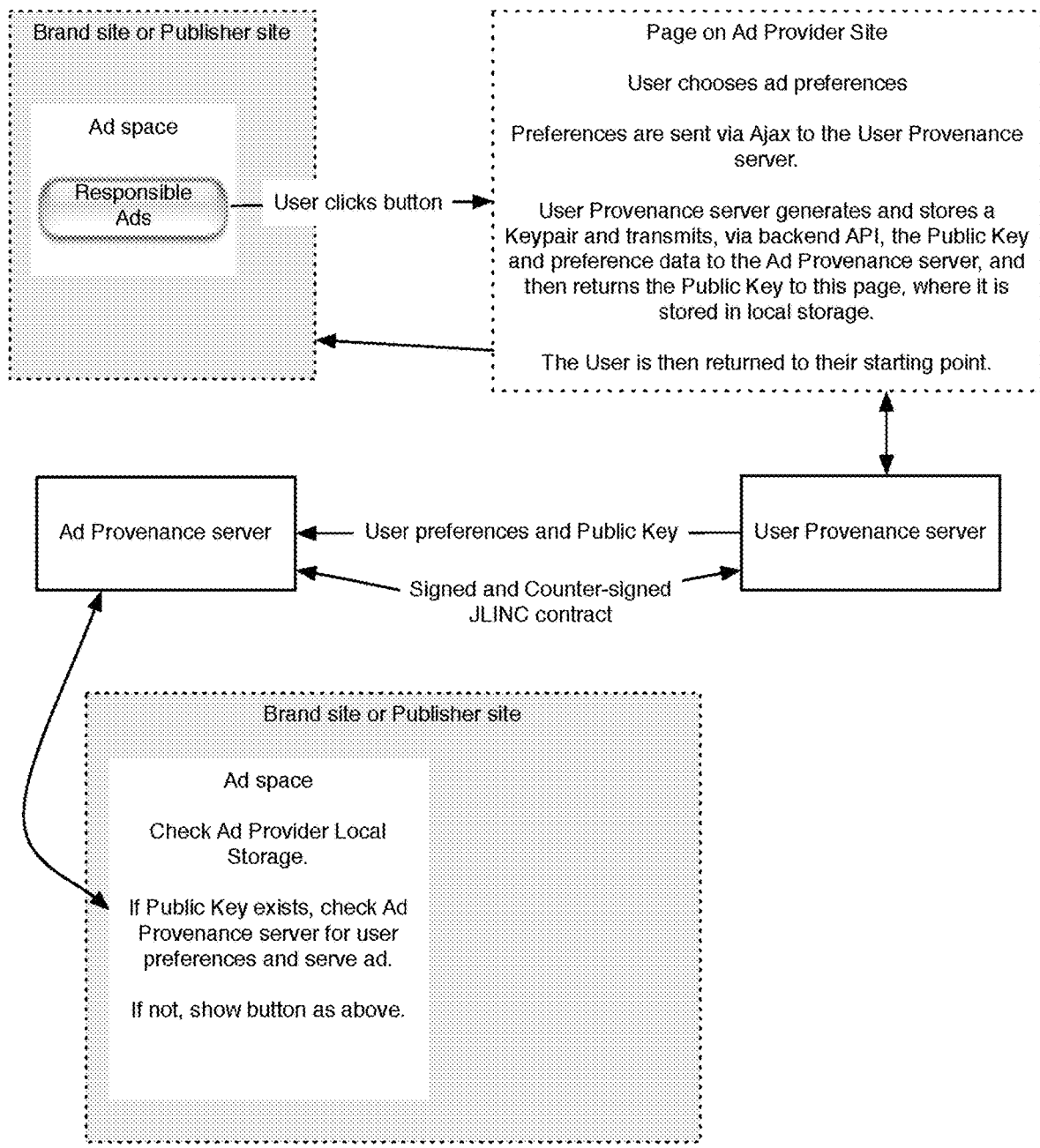
FIG. 1 depicts a diagram of the components required in the implementation and use of the method of the present invention as it relates to advertising.
Figure 2:
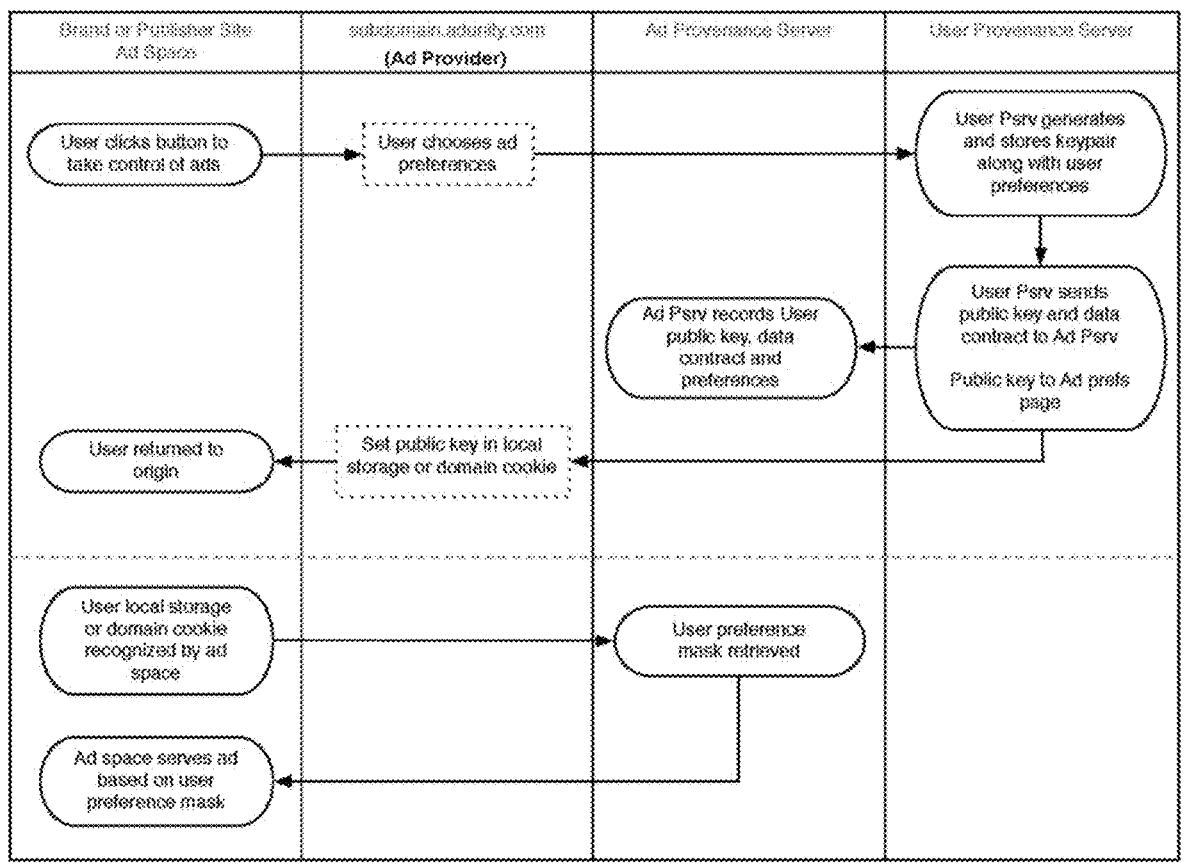
FIG. 2 shows a flow chart detailing the back-end processes enacted via the method of the present invention in order to facilitate seamless control over one's own internet data with respect to advertisements.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a system and method by which data may be easily defined, mapped, and transferred among databases while permitted, and only when permitted. Permissions are negotiated via cryptographically signed Information Sharing Agreements (ISAs), which are legally binding. The agreements ensure that data obtained is only used for purposed which is it permitted to be used for, and that data is only transferred to other parties when permitted. The system and method of the present invention employs JSON-LD, a data graph language by which administrators may define data transferal and then adds a new layer by which owners may define and agree permissions associated with the data.

For example, say a user is interested in purchasing a car. So the user discloses to a vendor, via an ISA agreement, stating that he or she is interested in a vehicle today. The data is related to the intent or interest of the user in a vehicle. User may later request the data to be returned or destroyed. This is of high value to both the user and the vendor. They are required to abide by the interest of the user, but it is in their interest as well to protect their reputation. The vendor does not have much to gain from stealing that data. Instead, by honoring the agreement, the reputation of the company is maintained and developed. Once the company fully embraces the new system it also benefits from better quality data at vastly reduced data maintenance cost, allowing more sales resources to be focused on serious buyers rather than wasting effort antagonizing currently uninterested customers, who recently bought a car for example.

The system and method of the present invention may also be applied to the web advertising space, wherein a user may set his/her preferences across a network of publishers, and be served ads that conforms to their interests while remaining essentially anonymous to the advertisers, and without being tracked the way that conventional ad tracking works.

The system of the present invention may be used for both credentialed users of a website, or for those that are not (or not yet) a user of the site. In such scenarios, the non-logged in user viewing a site may tailor his or her ad experience (and in turn, qualify usage of his or her anonymous user data), but wishes to view a site with the ad option, without having to disclose their actual identity, and without having to log-in. As such, the present invention enables users to remain anonymous, but to also have ads that are customized to them.

The system of the present invention is architected with a data graph language, such as JSON-LD, an open software protocol gaining prominence in use on the Internet. JSON-LD is a new graph language. The system, referenced as JLINC®, is expressed in this graph language, and adds cryptographically signed contracts and usage control, which is also written in the graph language. The system of the present invention is architected in this fashion in order to split or separate the end points of the data exchange—namely, between two adversarial entities. This "Separation of Concerns" concept is important to the essence of the present invention, which help expand the scale and scope of the system of the present invention to include not only the use/exchange of data, but to other online contracts and agreements as well. The audit trail of the contract that is completed is held by a fourth party, and a third party could supply a standard contract, or be a verified attribute provider (such as verification of age/location/etc.) This separation facilitated by the present invention allows for a protocol base for this on the Internet.

It should be understood that the sharing of user data among entities is especially relevant with respect to advertisements. Companies wish to advertise to users who have an interest in their product or service. Corollary companies or those which provide goods or services similar to those of other companies, often wish to exchange user data for mutual benefit. As such, much of the exchange of user data pertains to advertising. The system of the present invention includes a robust web application and desktop application, which interface with websites of these entities, to enable users to set broad permissions pertaining to their interests and user data preferences which are enacted globally to all entities (ad publishers to domains, as well as the companies of the domains themselves) equipped with the data access control system of the present invention.

The following terms are to be defined as follows as they pertain to the process and use of the system and method of the present invention:

Publisher—a content provider, which hosts ads on a website at a domain that it controls.

User—the individual consumer of content and ads via a web browser.

Ad Network—ad content provider contracting with the Publisher to deliver ads to the User.

Ad Preferences—a set of specific choices made by the User in response to a set of options presented, these could include what types of ads, in what interest area, from whom, etc.

ADprefs—a JLINC® enabled domain where a User can set and manage their Ad Preferences.

Figure 3:
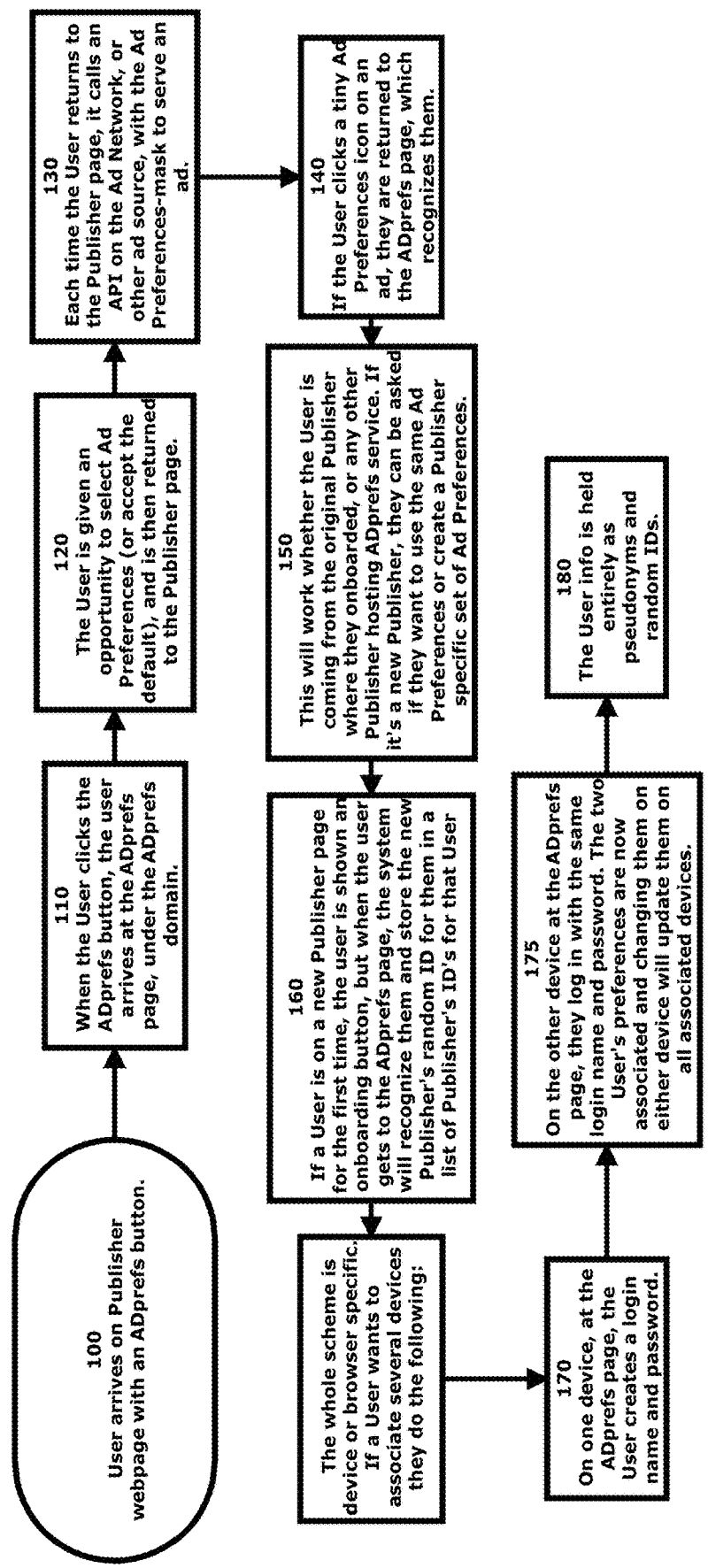
FIG. 3 details a flow chart showing the implementation and automated use of the system and method of the present invention.

The process of implementation and automated use of the system and method of the present invention, as shown in FIG. 3, is preferably enacted as follows:

1. User arrives on Publisher webpage with an ADprefs button. (100)
2. When the User clicks the ADprefs button, the user arrives at the ADprefs page, under the ADprefs domain. (110)
3. The User is given an opportunity to select Ad Preferences (or accept the default), and is then returned to the Publisher page. (120)
4. Each time the User returns to the Publisher page, it calls an API on the Ad Network, or other ad source, with the Ad Preferences-mask to serve an ad. (130)
5. If the User clicks a tiny Ad Preferences icon on an ad, they are returned to the ADprefs page, which recognizes them. (140) This will work whether the User is coming from the original Publisher where they onboarded, or any other Publisher hosting ADprefs service. If it's a new Publisher, they can be asked if they want to use the same Ad Preferences or create a Publisher specific set of Ad Preferences. (150)
6. After first onboarding, if a User is on a new Publisher page for the first time, the user is shown an onboarding button, but when the user gets to the ADprefs page, the system will recognize them and store the new Publisher's random ID for them in a list of Publisher's ID's for that User. (160)

7. The whole scheme is device or browser specific. If a User wants to associate several devices they do the following:
   a. On one device, at the ADprefs page, the User creates a login name and password. (170)
   b. On the other device at the ADprefs page, they log in with the same login name and password. The two User's preferences are now associated and changing them on either device will update them on all associated devices. (175)

8. Note, neither Ad Network nor ADprefs is collecting any PII, and so by definition they are not sharing or selling any PII. The User info is held entirely as pseudonyms and random IDs. (180)

Figure 4:
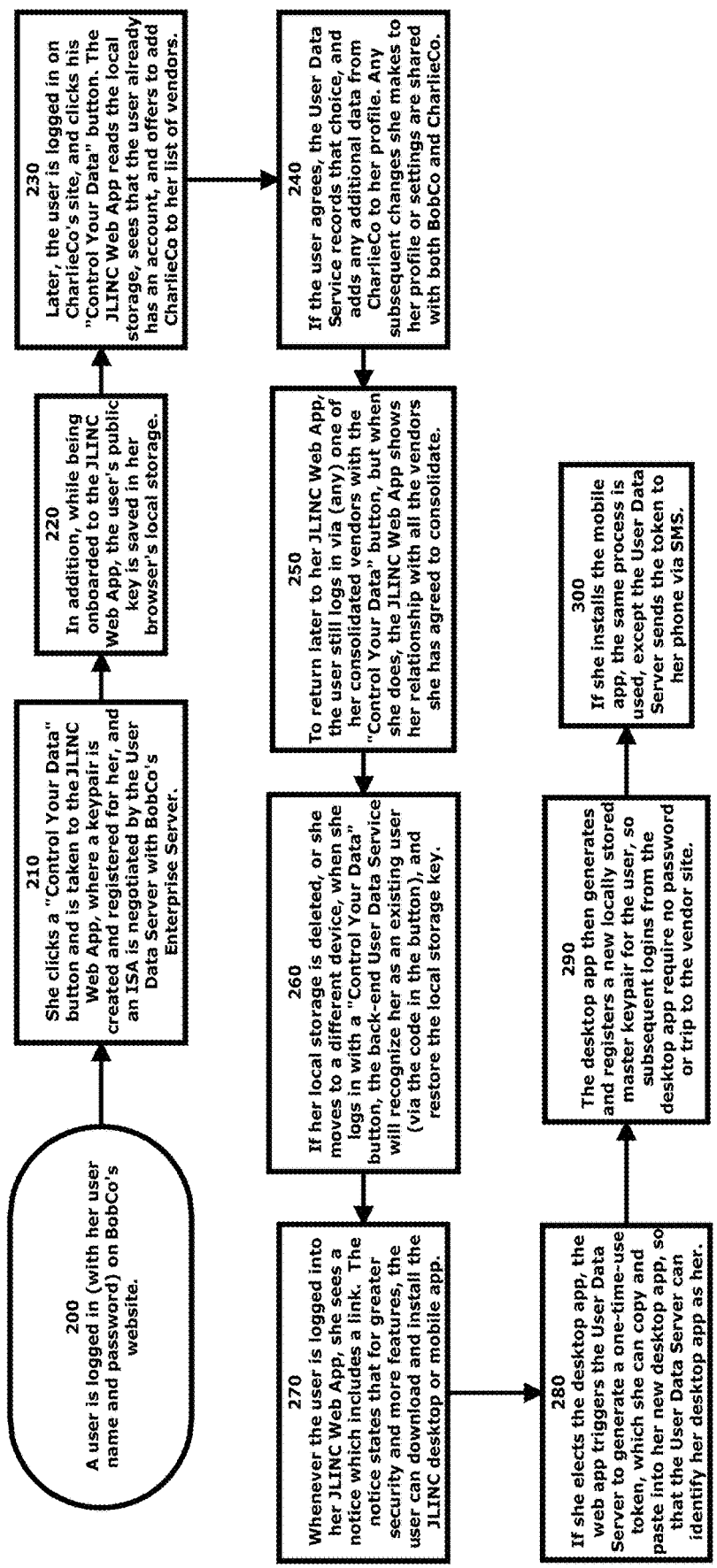
FIG. 4 exhibits a flow chart depicting the method steps of the present invention, showing the progression of internet data as permission is inquired and acquired with respect to advertisements.

An example of an end user employing the JLINC® system and interface of the present invention to control his or her advertising permissions and data usage is exemplified, as shown in FIG. 4, is as follows:

1. A user is logged in (with her user name and password) on BobCo's website. (200)
2. She clicks a "Control Your Data" button and is taken to the JLINC® Web App, where a keypair is created and registered for her, and an ISA is negotiated by the User Data Server with BobCo's Enterprise Server. (210)
3. In addition, while being onboarded to the JLINC® Web App, the user's public key is saved in her browser's local storage. (220) It could also be saved in a cookie, however presently the present invention does not require any cookies and so therefore, the system does not require a cookie notice. Some browsers set in their default settings that when a site wants to write to local storage for the first time, the browser puts up a permission box for the user to check 'OK'.
4. Later, the user is logged in on CharlieCo's site, and clicks his "Control Your Data" button. The JLINC® Web App reads the local storage, sees that the user already has an account, and offers to add CharlieCo to her list of vendors. (230)
5. If the user agrees, the User Data Service records that choice, and adds any additional data from CharlieCo to her profile. Any subsequent changes she makes to her profile or settings are shared with both BobCo and CharlieCo. (240)
6. To return later to her JLINC® Web App, the user still logs in via (any) one of her consolidated vendors with the "Control Your Data" button, but when she does, the JLINC® Web App shows her relationship with all the vendors she has agreed to consolidate. (250)
7. If her local storage is deleted, or she moves to a different device, when she logs in with a "Control Your Data" button, the back-end User Data Service will recognize her as an existing user (via the code in the button), and restore the local storage key. (260)
8. Whenever the user is logged into her JLINC® Web App, she sees a notice which includes a link. The notice states that for greater security and more features, the user can download and install the JLINC® desktop or mobile app. (270)
9. if she elects the desktop app, the web app triggers the User Data Server to generate a one-time-use token, which she can copy and paste into her new desktop app, so that the User Data Server can identify her desktop app as her. (280)
10. The desktop app then generates and registers a new locally stored master keypair for the user, so subsequent logins from the desktop app require no password or trip to the vendor site. (290)
11. If she installs the mobile app, the same process is used, except the User Data. Server sends the token to her phone via SMS. (300)

Security Considerations

The web app of the present invention is only as secure as the logins for BobCo and CharlieCo. This is exactly the same situation as with OAuth, i.e. if a user logs into all used sites with Facebook™, and someone compromises the user's Facebook account, they have access to all of the user's data.

Unfortunately, SMS as a second authentication factor is not as useful as it may seem. Essentially, if a malicious actor can hijack the user's phone account (which can be done), they own the user's SMS and likely the user's email as well. In such cases, the present invention encourages the use of Yubikeys (or similar) for security. It is predicted that eventually everyone will have two Yubikeys—one easily accessible, and one hidden away in the event that the first is lost or stolen.

A large number of variations may be present in the use of the system and method of the present invention. The previous description of the system focused primarily on volunteered personal data use cases. As previously noted, the system also includes use cases pertaining to advertising. It is envisioned that the system of the present invention also provides technical solutions to mandated compliance under PSD2 open banking rules or Know Your Customer rules, as well as GDPR requirements for personal data control and portability. It is envisioned that the system of the present invention may be employed with PSD2 APIs, in a manner which will allow a FinTech company to fulfill GDPR, with compliance handled via the system of the present invention. Presently, PSD2 requires banks to open an API, but then when the user gives a FinTech third party company that API access, there is presently no way for that FinTech company to fulfill the GDPR requirements for personal data control. With JLINC®, a FinTech provider can leverage the opportunity to expand into new business offered by PSD2, while also providing their customers granular control over his/her data required to comply with GDPR.

The system of the present invention may also be used for identity verification. For example, proof of identity, such as age or location/zip, is often required by some businesses which sell age-restricted items and services. In such domains, the system may be used to confirm that the user is indeed X years old, or is confirmed as physically in a certain location, and then the data may be shared according to this confirmed and legally obtained data.

Similarly, the system may be configured such that a third party counter-signs with a key, such as something like a hard identity qualification, including stating that the user is over 18, or saying that this is the child of the person as evidenced by this token, all without knowing the identity of the person. As such, the system can be used for child-proofing space for domains, even for anonymous users.

It should be understood that the system and method of the present invention need not be restricted to use in advertising, but instead extends to any and all agreements to be made securely by one or more parties over the Internet. While JSON-LD is employed as a graph language, it should be understood that other graph languages may be used in lieu of JSON-LD.

For example, it should be understood that another key advantage of the current invention is that it provides a mechanism for delegated consent, whereby one party may give consent for use of data, which may be shared by a second party under the authority of the first party, with additional third, or fourth parties, etc. The conditions may be automated, and may be set by the first party contingent on conditions which must be satisfied by the additional parties, and could also be combined with other conditions in a logical or Boolean manifold. For example, continue to share this data with car dealers that have inventory in a certain model, in a certain color, up until a specified date, or until notice is transmitted that the first party has completed a purchase and is no longer in the market. No party may retain the data or retransmit the data upon receipt of an instruction from the first party to delete it.

Such automated logical contractual hierarchy are not limited to business-to-consumer use case scenarios, but can also be employed in any commercial contract or supply chain, such as for example one where a potential customer places an open order for information, or to actually execute an automated purchase, based on the vendor meeting specified terms for the product specification, delivery date, financing terms, etc. The commercial contract could include pure financial instruments and trades in commodities, derivatives or other financial instruments or products.

It should be understood that an alternative commodity backed trade credit could be established using the current invention where machine-readable contracts backed by one or more commodities are exchanged as trade credits. These credits serve as an inflation-resistant unit of exchange where liquidity is provided by the capability to express the units in contracts, which are both human and machine readable and can be inspected by a judge (unlike other previous blockchain-based contracts).

Similarly, it should be understood that a mutual-credit trade credit system could be established using the current invention wherein individuals and/or entities can extend credit to each other in the form of tradable IOU's. These tradable contracts constitute a method of creating liquidity among a network or community. The ability to automate contractual exchange and to associate identity with attributes which can be expressed as keys, which are in turn used to countersign the keys used to sign trade credit contracts, allows the present invention to provide the necessary missing infrastructure for a working community credit system.

Other versions include scenarios involving the Internet of Things (IoT), whereby a device creates data about, and/or on behalf of, an individual, or other entity, where the device signs the data before it is transmitted, and the use of that data is governed under an ISA between the individual or entity that uses the device and an entity that receives the data.

In another class of embodiments, data may be exchanged between two or more commercial entities in a business relationship where the contract governing the data is a complex legal document that has been negotiated between their respective legal departments to govern the exchange of particular data between their respective databases under specific terms and conditions on an automated basis possibly triggered by internal or external events, and/or by time cycle events.

In another class of embodiments, the chain of data provenance created by a sequence of commercial parties, each signing an ISA associated with the movement and processing of goods through a supply chain, may be used to help govern that supply chain. Here, the data provenance represents and verifies the physical chain of custody, or provenance, associated with the sequence of activity in a material supply chain. The cryptographically signed and verified documentation proving origin of raw materials or food inputs, and therefore the integrity of that supply chain, may also add value for the end user, or consumer, of the resulting product.

In another preferred class of embodiments, the protocol and system of the present invention may be used for three-party interactions, as detailed below.

The JLINC® protocol of the present invention enables a more secure and flexible solution that addresses the requirements of both PSD2 and GDPR. The following is a description of the JLINC® protocol as it applies to a three-party interaction:

The three actors involved in the system and implementation of the present invention, and their interacting cloud services, per an example interaction, are as follows:

The Bank, referenced as "BankCo".
The bank's agent, the BankCo JLINC® Solutions Service.
The Financial Technology company, referenced as "FinCo".
The Financial Technology company's agent, the FinCo JLINC® Solutions Service.
The end-user, the "data subject" in GDPR terms, or "resource owner" in OAuth terms, referenced as "Alice."
Her agent is the JLINC® Data Service, which she accesses via her JLINC® App.

Figure 5:
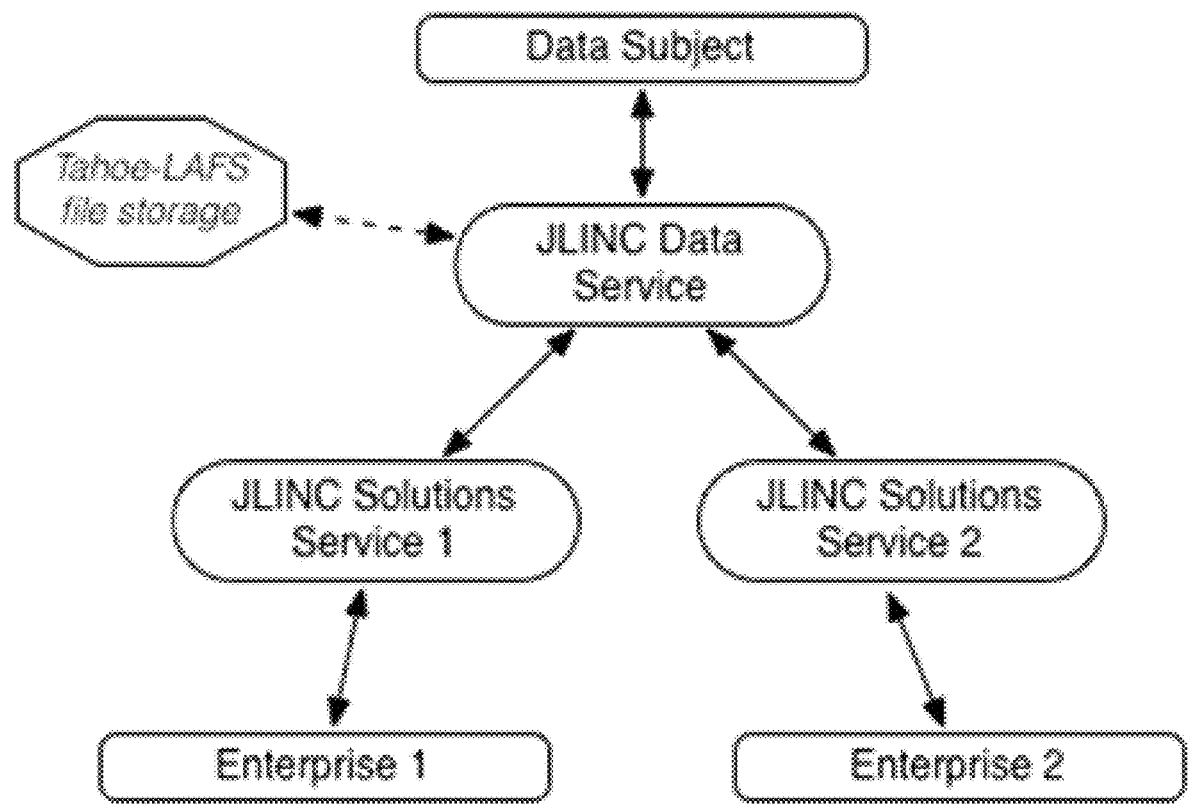
FIG. 5 depicts a flow chart showing the interaction between three parties and the JLINC® Data Service of the present invention.
Figure 6:
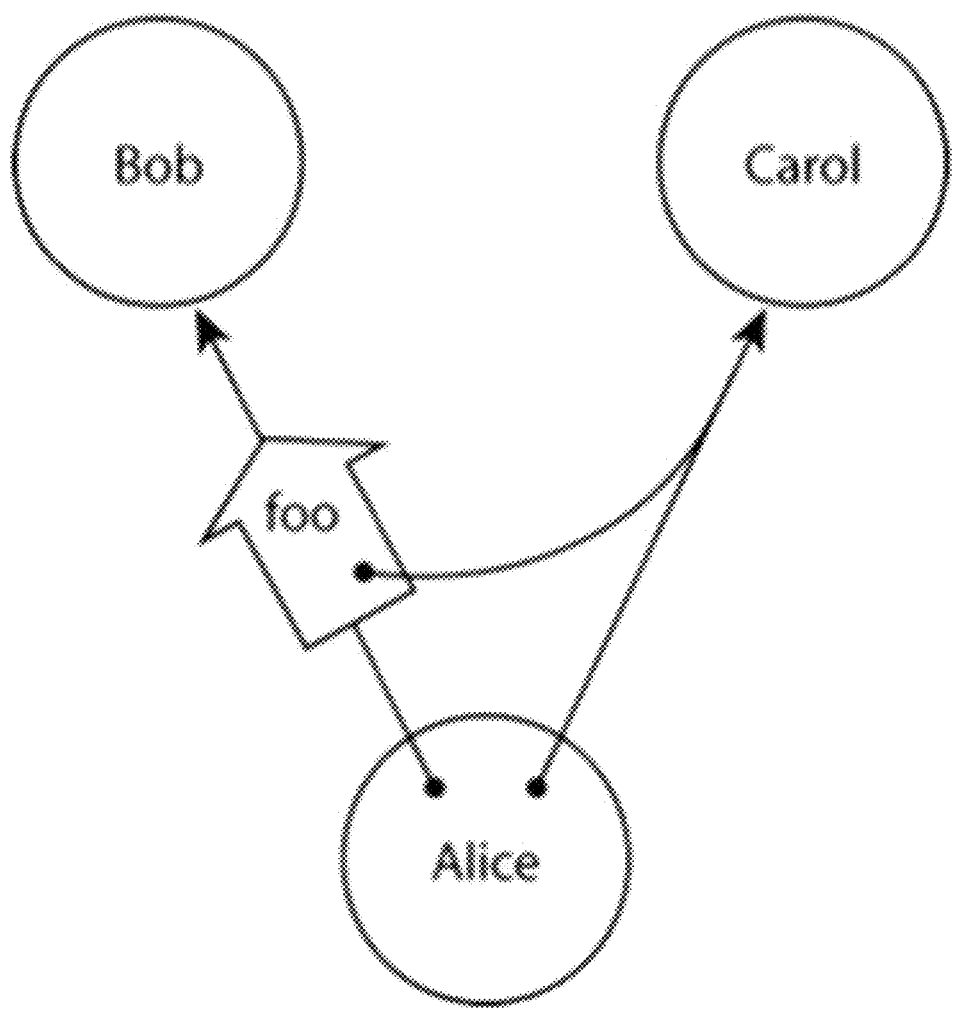
FIG. 6 is prior art from Miller.

The interaction of the three parties can be seen in FIG. 5.

Alice can be initially onboarded to the system of the present invention (JLINC®) via either BankCo or FinCo. For this discussion example, it is assumed she is being onboarded by BankCo, but the process is the identical, regardless of how Alice is onboarded to the system.

BankCo initializes each existing or new customer on its JLINC® Solutions Service by sending the customer's account number or other ID that uniquely identifies the customer in the bank's records to the appropriate JLINC® Solutions Service API. Then, the process is as follows:

1. JLINC® Solutions Service contacts Alice's JLINC® Data Service, which instantiates a key pair for this user (Alice) and sends the public key back to the JLINC® Solutions Service as a pseudonymous identifier along with a proposed information Sharing Agreement signed by Alice's private key.
2. The JLINC® Solutions Service records the public key, counter-signs the Information Sharing Agreement, and returns it to Alice's JLINC® Data Service. Both se ices can record this agreement with a third-party audit service as well. JLINC® Solutions Service also at this time creates a one-time random ID and uses that ID to make a one-time-use URL that BankCo can present to Alice to bring her onboard.
3. The JLINC® Solutions Service may also return along with the signed Information Sharing Agreement some data which the bank wishes to share and/or co-manage with Alice, which she can change, update or withdraw at any time in accordance with the Information Sharing Agreement.
4. When Alice accesses the URL, she is brought to the JLINC® Data Service login page. When she logs in, the new pseudonym is associated with her account. If she does not yet have an account, she can register a new account, and the pseudonym is then associated with her new account.

Alice can add a FinCo account to her JLINC® Data Service by selecting it in her JLINC® app. The process works similarly to the above, except in reverse. This process is preferably as follows:

1. First, the JLINC® Data Service generates a new key pair for Alice, and sends the public key to the FinCo JLINC® Solutions Service with a signed proposed Information Sharing Agreement.
2. The FinCo JLINC® Solutions Service counter-signs the War/nation Sharing Agreement and returns it to the JLINC® Data Service. It messages the FinCo API to create a new customer record and records the new customer ID.
3. FinCo can then request data from Alice's JLINC® Data Service. Alice will have pre-authorized a certain profile or data set when she initiated the FinCo account request, which she can change, update or withdraw at any time. The data that has been authorized by Alice to share may include BankCo data that Alice has received from BankCo according to the Information Sharing Agreement.

The list of available JLINC® Solutions Services that Alice can choose to add to her JLINC® Data Service is created and maintained by an out-of-band registration process that establishes a unique API key and API secret shared between that JLINC® Solutions Service and her JLINC® Data Service.

All communications between the respective services are conducted over encrypted sessions (generally TLS), but for further security two other measures are required.

First, all messages include the sender's API key, and are formatted as JSON Web Tokens protected by an HMAC section using the shared API secret, thus mitigating a man-in-the-middle attacker from altering the message in transit between the services without detection.

Additionally, the contents of the message are encrypted with the intended recipient's public key for that relationship. Thus only the possessor of Alice's corresponding private key can read the contents of the message, and any attempt to alter the message contents will fail.

PSD2 Services

To implement PSD2 services, FinCo needs to access BankCo's PSD2-required APIs on Alice's behalf. The method for enabling this currently under consideration by relevant standards bodies is an OAuth2 framework. The preferred steps of this method are as follows:

1. First, the present invention employs an extension to OAuth2 to allow Alice and/or her JLINC® Data Service to authenticate at BankCo with a key challenge rather than a username and password. It will work as follows.
2. Next, Alice indicates to FinCo (either logged in at the FinCo site, or by pre-arrangement) that she wishes FinCo to perform some action involving BankCo on her behalf.
3. Then, under an existing ISA (a hash of the ISA is included in the request), FinCo's JLINC® Solutions Services calls an API at Alice's JLINC® Data Service to request a capability from BankCo.
4. Next, Alice's JLINC® Data Service in turn makes an API call to BankCo's JLINC® Solutions Service for the capability, including a hash of Alice's ISA with BankCo.
5. Next, BankCo's JLINC® Solutions Service presents Alice's public key to BankCo's authentication API in lieu of a username.
6. Next, BankCo returns an authentication challenge, a random number or string. Crucial to the security of this step, the challenge must be of sufficient length and sufficiently random, and must never be reused. BankCo's JLINC® Solutions Service preferably includes a check to prevent challenge reuse.
7. Then, BankCo's JLINC® Solutions Service encrypts the challenge with Alice's public key and sends it to her JLINC® Data Service. Her JLINC® Data Service decrypts the challenge, signs it with Alice's private key, re-encrypts the signed challenge with BankCo's public key, and sends it back.
8. Then, BankCo's JLINC® Solutions Service decrypts the signed challenge with BankCo's private key if BankCo does not have the ability to do this itself, and in any case presents the signed challenge to BankCo.
9. Next, BankCo verifies the signature with Alice's public key and then returns an OAuth token. This step is in lieu of the standard OAuth technique where Alice would have been redirected to and authenticated at BankCo's site, and then been redirected to FinCo with the OAuth token.
10. Then, BankCo's JLINC® Solutions Service encrypts the token with Alice's public key and transmits it to Alice's JLINC® Data Service. Alice's JLINC® Data Service decrypts the token, re-encrypts it with FinCo's public key and transmits it to FinCo's JLINC® Solutions Service.
11. Finally, FinCo's® Solutions Service decrypts the token and presents it to FinCo to use as per the established OAuth framework.

At the conclusion of this process, the system of the present invention has presented a BankCo generated capability to FinCo, but has significantly mitigated the ability of a 'man-in-the-middle' attacker to replay the transaction, or to steal Alice's credentials or her OAuth token. By placing Alice at the center of the data event, the system of the present invention has given her visibility into, and control over, the whole process.

JLINC® Solutions Service Connectors

An enterprise/business/entity may connect its data source(s) to a JLINC® Solutions Service either with a direct CRM to JLINC® Solutions Service database connector (for example the Postgresql database system's foreign data wrapper mechanism), or by using the JLINC® Solutions Service API.

Onboarding New End-Users

Enterprises may initialize existing or new customers on its' own JLINC® Solutions Service in two ways. If the enterprise is using a direct CRM to JLINC® Solutions Service database connector, then the JLINC® Solutions Service database triggers the creation of a random one-time-use identifier. Otherwise the enterprise may send the customer's account number or other ID that uniquely identifies the customer in the enterprise's records to the appropriate JLINC® Solutions Service API.

Then, in either case:

1. First, the JLINC® Solutions Service of the present invention contacts the new end-user's JLINC® Data Service, which instantiates a key pair for this user and sends the public key back to the JLINC® Solutions Service as a pseudonymous identifier along with a proposed Information Sharing Agreement signed by the new end-user's private key.

2. Then, the JLINC® Solutions Service records the public key, counter-signs the Information Sharing Agreement, and returns it to new end-user's JLINC® Data Service. Both services can record this agreement with a third-party audit service as well. JLINC® Solutions Service also at this time creates a one-time random id, or uses the one created by the database trigger if that is the case, and uses that id to make a one-time-use URL that BankCo can present to new end-user via email or other means to bring her onboard.
3. Then, the JLINC® Solutions Service may also return along with the signed Information Sharing Agreement some data which the bank wishes to share and/or co-manage with new end-user, which she can change, update or withdraw at any time in accordance with the Information Sharing Agreement.
4. When the new end-user accesses the URL, she is brought to the JLINC® Data Service login page. When she logs in, the new pseudonym is associated with her account. If she does not yet have an account she can register one, and the pseudonym is then associated with her new account.

JLINC® Audit Service

As part of the JLINC® protocol of the present invention, all parties to any data event may each specify a JLINC® Audit Service. The protocol requires that each party so notified transmit, within a reasonable period of time, a copy of the signed data event receipt that was created as part of the data event to the specified JLINC® Audit Service.

The JLINC® Audit Service matches receipts, and issues a notification to all parties involved if, after a period of time, it has not received matching receipts from both or all parties to the data event in question. These receipts are designed to offer cryptographically non-refutable proof that the parties agreed to the data exchange in question.

The JLINC® Audit Service of the present invention also provides a key-registration service that registers public keys for all parties that use the service. In the event that a corresponding private key is compromised or withdrawn from service for any reason, the JLINC® Audit Service records that fact, along with a public key that has superseded the invalid one if applicable. If a receipt is received by the JLINC® Audit Service containing an invalid public key, the service returns a notice to that effect, along with any information about superseding keys. The JLINC® Audit Service also provides an API to check public keys for validity and supersession directly.

Following is a non-exhaustive description of some of the uses made possible with JLINC. The following terms apply throughout:

SISA—a standard information sharing agreement.
SISA Event—a software defined object that both carries data and a reference to the SISA under which the data is being shared, and provides an auditable record of the data sharing and the SISA context under which it took place.
DID—a decentralized identifier which can be dereferenced to a public key used to verify the authenticity of an actor in the system.
VC—a verified credential establishing the real world identity of an actor in the system, or some other attribute if specified.
Agent—a software program that operates under the control of, and with fiduciary obligation to an entity, and represents and facilitates interactions with other entities via their agents.

Use Cases:
1) News articles and social media postings with verifiable provenance.
a) The original author or authors is identified with a DID, and optionally a VC, and the article is assigned a globally unique identifier.
b) The SISA requires each publisher to have a VC and a DID.
c) A chain of provenance accompanies the article, showing the DID of the author and the DID and VC of each publisher or re-publisher in sequence, along with the article's original identifier.
d) The SISA requires the author and each publisher and re-publisher to sign the provenance chain with the private key that can be verified with the signing key indicated by their DID, and to make the chain and signatures available with the article.
2) Usage control over personally identifying information (PII).
a) An individual wishing to share PII with a merchant or supplier of services causes their agent to create a new DID for that purpose.
b) Their agent then signs a selected SISA and offers it to the supplier's agent for co-signing, or alternatively the supplier choses and signs a SISA and the individual's agent co-signs it if acceptable.
c) Either way, both parties wind up with a signed and co-signed SISA that will govern their data sharing, and data can then be safely shared via SISA Events.
3) Public pledge signing.
a) A party identified by a DID and other identity information can publish a pledge, optionally including a SISA.
b) Another party, also identified by a DID, can sign the pledge and the SISA, which if present governs how the fact that and the identity of the second party who signed the pledge can be used or made public.
4) Contract signing.
a) Two or more parties, each identified by a DID, can sign or co-sign a contract.
b) The contract may contain a SISA, or be accompanied by a SISA.
c) The fact of signing by each party generates a SISA. Event which provides an audit record and non-repudiation.
5) Capabilities for 3rd party sharing with usage and provenance control.
a) An individual or other entity wishes to give conditional access to one party (for example a financial technology provider) to the entity's account at another party (for example a bank). This can provide a more secure and flexible arrangement for standards such as the Open Banking Initiative or the European PSD2
b) It is not limited to financial exchanges however. Any exchange where a controlling party wishes to grant partial and conditional access to a second party by third parties is germane.
c) For the purposes of explication, we will refer to these entities below as Alice (the individual), the Fintech and the Bank.
d) The Fintech signs a SISA with its DID specifying which access it needs and the limitations and obligations it accepts and transmits it to Alice's agent as a SISA Event.
e) If Alice concurs, she co-signs the SISA and returns it to the Fintech as a SISA Event sequenced to the original. It is now a Capability.
f) The Fintech proffers the Capability to the Bank. The Bank checks the signatures and also verifies the existence of the SISA events with Alice's agent. If all is correct the Bank engages with the Fintech on Alice's behalf according to the limitations and instructions of the SISA.

g) Each interaction between the Bank and the Fintech generates another SISA event, providing a chain of auditable records available to Alice.

h) The SISA may provide a notice of which data the Bank may share, which data the Fintech may modify or insert, Alice's rights to time-limit or withdraw the validity of the Capability, and the fiduciary obligations of each party, as well as any other desired requirements.

6) Notaries Public.

a) A notary public may register with a JLINC service and receive a DID.

b) A member of the public who also is registered with a JLINC service brings some document which they wish to be notarized.

c) The customer opens their JLINC app, selects a menu item that generates a QR code on the phone, and shows the QR code to the notary's app, verifying the customer's DID.

d) The notary verifies the document and creates a VC signed by both the notary's agent and the customer's agent, memorialized as a SISA Event.

e) The customer can then present the VC, to a third party, which can verify the validity of the credential or document by verifying the signatures on the VC.

7) Verified Attributes.

a) A government organization or private agency may register with or create a JLINC service and receive a DID.

b) A member of the public who also is registered with a JLINC service applies to the agency to have attribute(s), knowledge or abilities certified.

c) The applicant opens their JLINC app, selects a menu item that generates a QR code on the phone, and shows the QR code to the agency's app, verifying the applicant's DID.

d) The agency makes the certification and then records it with their JLINC agent via their app and the respective JLINC agents use the JLINC protocol to create a mutually signed VC, memorialized as a SISA Event.

e) The applicant can then present the VC to a third party, which can verify the validity of the certification by verifying the signatures on the VC.

f) Optionally the applicant's JLINC agent may create one or more zero-knowledge proofs that provably assert some aspect of the certification without revealing any unnecessary details. For example, a ZKP might provably assert, that the applicant is over 21 years of age, without revealing their actual birthdate.

8) Voting and Polling.

a) A JLINC agent can create on behalf of a user a specialized voting DID. This DID contains a service endpoint object of a type indicating usage for voting or polling.

b) The JLINC agent creates one or more cryptographic hashes of attributes by which it authenticates this user (for example a mobile phone number) and adds them to the instances array of the voting service endpoint. These hashes are then used as unique identifiers by the user for the purpose of voting or polling.

c) A JLINC agent which knows their user's voting Dm and one or more of their authenticating attributes can rehash the authenticating attribute and present that hash and the DID to a voting or polling app to uniquely identify the voter without revealing any PH. This prevents double voting or other voting fraud.

9) Supply chain verification.

a) Multiple parties, each with a JLINC agent, can sign SISA Events referencing VCs to verify the origins and movements along a supply, chain.

10) Fiduciary agent for secure file storage.

a) An entity's JLINC agent can interact with any capable secure digital file storage facility on behalf of the entity, under the entity's SISA with the agent.

11) Advertising preferences.

a) The JLINC service has established relationships with various brands and/or media companies to provide advertising under a SISA agreement spelling out how revenue from the advertising is to be distributed, and under what circumstances any user data that is revealed may be used.

b) An end user has registered their preferences with their JLINC agent for what types of advertising they would like to see. They may update these at any time they wish.

c) In some applications they have also become a party to an advertising SISA contract protecting their privacy and usage of any data they provide.

d) The user accesses a publisher's site with a JLINC equipped browser (possibly an add-on application, i.e. a plugin), or via a JLINC portal application.

e) The publisher has made advertising space available, marked out in the display code as JLINC advertising space.

f) The JLINC application selects advertising filtered by the user's preferences and also possibly by the publisher's context, and fills the advertising space for the user's viewing.

g) The JLINC application records each ad's identifier and the user's and publisher's DIDs to create a SISA event that can be used for revenue distribution.

12) Group forming and group information sharing.

a) A JLINC service can facilitate the formation and operation of online groups by generating and managing DIDs for the group and each participant, and by tracking the provenance of each contribution to the stream of content offered to the group by its participants.

b) A participant in a group may be identified by their DID only and no PII, thereby creating a persistent pseudonymous identity.

c) The privacy and confidentiality of each participant is maintained by a SISA.

d) Socially validated identity arises from such an arrangement. Although each participant is known to the group only by their persistent pseudonym (a DID), over time the quality and nature of the content they provide to the group becomes associated with their DID.

e) A group may publish individual items of content, either publicly or privately to its network(s).

f) If the group desires PII from its participants, it can offer a SISA to protect its usage and confidentiality.

13) Network forming among groups, and information sharing and relationship graphs between groups in a network.

a) A JLINC service can facilitate the formation and operation of networks of online groups by generating and managing DIDs for the network and each group, and by managing the graph of relationships and SISAs between them.

b) Content originating from its member groups can be filtered and rated by the network, producing a stream of the highest quality content.

c) Each item of content is accompanied by a unique identifier as well as the DIDs of the originator and the group that published it and the network(s) that republished it, thereby maintaining the provenance of each item of content.

d) A group may belong to one or more networks, and networks may belong to one or more other networks.

e) Content can be republished and filtered and rated by each node in the relationship graph of networks and groups. The provenance of content is maintained by SISA Events that record and make auditable the chain of authorship and publishing/republishing.

f) Content can be republished via multiple paths in the graph and converged again by means of the provenance chains.

14) COVID19 testing and other medical data.

a) User arrives at a local testing station that offers a pulse-oximeter or other medical data testing on a JLINC enabled device.

b) The user opens their JLINC app, selects a menu item that generates a QR code on the phone, and shows the QR code to the testing device, verifying the user's DID.

c) The device signs a record of the test result(s) with its DID and the user's DID and sends it as a SISA Event to the user's JLINC agent.

d) The user's JLINC agent keeps a time-series record of these tests which the user can reference, and also provides a VC of the time series that the user can choose to share with validated third parties via a medical SISA.

15) A microcredit payment system.

a) A SISA can be crafted to serve as a financial instrument by describing an agreement to pay from a prepaid account or digital wallet, or to accrue a credit to one party and a debit to the other, each time a SISA Event occurs under that SISA.

b) SISA Events are extremely compact but cryptographically verifiable records that can be stored by each participating party, and on any mutually agreed audit ledger(s), at almost infinitesimal expense. They are well suited to facilitate a micropayment or microcredit system in a novel way, providing cryptographic security, verifiability and non-repudiation to payment contracts at a small enough cost that tiny transactions become practical. These transactions might include for example payment for reading an article, listening to an audio recording or watching a video recording.

c) At the end of an agreed period, upon a total accrued value being reached, or other mutually agreed event, the contracts could all be cleared, and the net balance submitted for payment using a conventional financial mechanism.

16) A mutual credit system.

A JLINC network can be formed (see item 11) using a SISA wherein parties agree to extend credit to each other, or to all parties within the network based on some mutually agreed formula to determine credit worthiness.

b) The parties could then engage in commerce together, where debits and credits are created using SISA Events. The actual amounts of the individual transactions could be micro transactions (see item 13), or could be for larger amounts.

c) The network creates mutual credit in a novel way, whereby the participants effectively go into debt with each other to create mutual liquidity.

d) This solution is particularly effective where a network of parties seeks to barter services with each other in a manner that also generates the ability to purchase goods priced in hard currency. By pricing the exchanges in hard currency units and also including non-service based goods in transactions, the network could generate actual liquidity for the combined transactions among all parties.

e) In an extension of that model, if the transactions were priced in a unit based on an index of a standard market basket of commodities instead of in one or more hard currencies, the pricing would be stable in the face of fluctuations in fiat money values and any associated global inflation or deflation.

17) A sponsorship-based publishing system with verifiable author and sponsorship provenance.

a) A sponsor that wishes to be associated with a content producer signs a SISA pledging financial support in exchange for being recognized in some form, text, graphic, audio, visual on the posts containing content and or the home page of the content producer.

b) The content producer, the sponsor(s) and any associated publisher(s) are identified with a DID, and optionally a VC, and the content is assigned a globally unique identifier.

c) A chain of provenance accompanies the content, showing the DID of the producer and the DID and VC of each sponsor and publisher or re-publisher in sequence, along with the content's original identifier.

d) The SISA requires the content producer, the sponsor(s) and each publisher and re-publisher to sign the provenance chain with the private key that can be verified with the signing key indicated by their DID, and to make the chain and signatures available with the article.

e) Payments can be proportional to the total page number of views accrued by logged in people with verified accounts under the terms of one or more standard contracts.

f) Payment could also be influenced by the total level of elevation content receives by viewers.

g) The content posts and/or home page can also include a clickable link that takes the person viewing content to the sponsor's page where the viewer can connect directly with the sponsor, optionally under a SISA.

h) Where a logged in person does click through to the sponsor, the content producer can receive additional payment under the terms of the SISA(s).

18) A networked variation on the sponsorship-based publishing model a) A publication with a separate editorial board can aggregate into a JLINC network a number of efferent content producers with efferent sponsors, either on a for-profit, non-profit, or hybrid basis.

b) The publication is represented by an editorial staff or board that is insulated from direct contact with or influence by the sponsors.

c) Sponsors can be introduced by an entirely automated system, and/or by separate sales and marketing staff.

d) Sponsorship is paid under similar standard contacts based on total views, elevation, and/or click through by people who view content.

19) A viewer/consumer funded publishing model with verifiable content producer and publisher provenance a) This system operates similarly to the sponsorship-based publishing system, except instead of sponsors the content producers and publishers are supported by the consumers of the content.

b) People using the system are identified with a DID and their data is protected by SISA. They receive a wallet that is supported by a percentage of total revenue divided by total number of people, and/or total number of person hours consuming content.

c) Funds from the wallet are disbursed to content producers and/or publishers based on some combination of one or more of the following measures:
i) Views per person
ii) Total views
iii) Total viewing time
iv) Individual apportionment of the wallet by the choice of viewers 20) A wallet-based variation on the sponsorship-based publishing model a) People using the system are identified with a DID and their data is protected by SISA.

b) The content producer, the sponsor(s) and any associated publisher(s) are identified with a DID, and optionally a VC, and the content is assigned a globally unique identifier. All parties sign an appropriate SISA.

c) Sponsors pay into a pool whereby viewers agree that their wallet will be credited by sponsors when they visit a sponsor's page and/or view a sponsor's content.

d) The viewer can then disburse the resulting payment to content producers and publishers based on their own choice, and/or can choose to apportion it based on their own activity based on some combination of one or more of the following automated measures:

i) Views per person
ii) Total views
iii) Total viewing time

Figure 7:
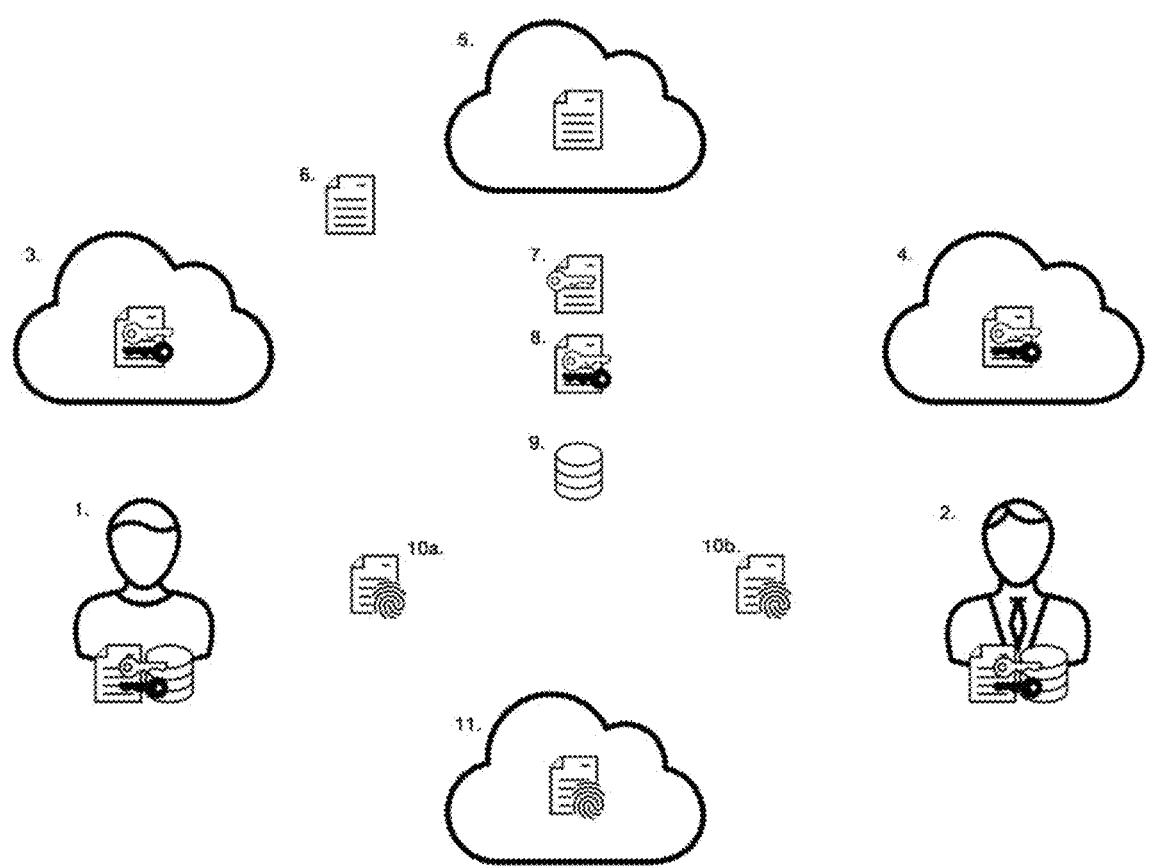
FIG. 7 is a flow of the present invention.

With reference to FIG. 7, a flow of the present invention is shown.

KEY FOR FIG. 7

1. Party 1
2. Party 2
3. Agent 1
4. Agent 2
5. SISA Service
6. SISA—a standard information sharing agreement.
7. SISA signed by Agent 1 for Party 1
8. SISA counter-signed by Agent 2 for Party 2
9. Data transmitted between Parties under SISA terms
10. Signed hash of a completed SISA transaction sent to each party (depicted as 10a sent to Party 1 and 10b sent to Party 2)
11. Audit Record Service It should be understood that the protocol and tech of the system and method of the present invention may be deployed in any situation where there are multiple parties relating to the exchange of data on a permissioned basis.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

We claim:

1. A link contract system, comprising:
   one or more servers communicatively coupled with two or more communication devices;
   wherein the one or more servers are configured to:
      verify one or more verifiable credentials (VCs) of one of the first party and the second party;
      facilitate communication of a proposed link contract, that includes the one or more VCs, between the parties;
      receive digital signatures to the proposed link contract from the parties to generate a digitally signed link contract with the verifiable credentials (DSLC-VC), wherein the digital signatures are facilitated using private cryptographic keys and are one of generated and verified by computer system agents;
      generate a cryptographic hash of the DSLC-VC; and
      provide the cryptographic hash and the digital signatures to the parties as proof of agreement to the DSLC-VC; and
      wherein the DSLC-VC is machine readable and comprises a human readable Information Sharing Agreement (ISA); and
      wherein the one or more servers are configured to govern one of access to and usage of data of the first party under terms of the ISA.

2. The system of claim 1, wherein the one or more servers are configured to govern, under terms of the ISA, a capability by which a third party has one of conditional limited access and conditional limited usage rights to data of the first party.

3. The system of claim 1, further comprising a computer system agent of one of the parties facilitated by the one or more servers, wherein the system facilitates sharing of one of confidential information (CI) and personally identifiable information (PII) of that party by the computer system agent creating a new decentralized identifier (DID) and the computer system agent signing the proposed link contract, wherein the one or more servers are configured to govern the sharing of the one of the CI and PII under terms of the DSLC-VC.

4. The system of claim 1, wherein the one or more servers are configured to govern, under terms of the DSLC-VC, advertising preferences of the first party that are transmitted to the second party and to one or more third parties so that advertising provided to the first party falls within the advertising preferences of the first party.

5. The system of claim 1, wherein the first party and second party are identified by decentralized identifiers (DIDs), and wherein an exchange of the digital signatures generates or triggers one or more data events which provide non-repudiable audit records proving the existence and one or more terms of the DSLC-VC.

6. The system of claim 1, wherein the one or more servers are configured to govern, under terms of the ISA, an automated exchange of data occurring in response to one or more trigger events.

7. The system of claim 1, wherein the system facilitates verification of one of a state, attribute, data, sensor data, document and documentation by a verifying party or its computer system agent (verifying agent) receiving a decentralized identifier (DID), the first party or its computer system agent (first agent) demonstrating the document and a verifiable credential signed by the first party or the first agent to the verifying party or verifying agent, the verifying party or verifying agent verifying the document and a DID of the first party, and the verifying party or verifying agent countersigning the verifiable credential (VC), the countersigned VC recorded as a data event by the one or more servers.

8. The system of claim 1, wherein the system facilitates multi-party interactions in which the first party enters the ISA with the second party, a computer system agent of the second party (second agent) signing with a key referenced by a decentralized identifier (DID) specifying access it needs to the data, a computer system agent of the first party (first agent) signing the ISA to create a capability, the second agent transmitting the capability to one or more computer system agents of one or more third parties (one or more third agents), the one or more third agents confirming the existence of the ISA and one or more ISA events associated with the first party, and the one or more third agents and second agent exchanging the data under terms of the ISA.

9. The system of claim 1, wherein the system records provenance of the data relative to one or more third parties, each of the one or more third parties comprising part of a supply chain supplying a product or service to the first party, each of the one or more third parties signing the ISA.

10. The system of claim 1, wherein the DSLC-VC comprises a financial instrument and wherein the one or more servers are configured to automatically enforce terms of the financial instrument.

11. The system of claim 1, wherein the system facilitates accruing a plurality of digitally signed and auditable data events that are cleared to a separate financial system as a batch.

12. The system of claim 1, wherein the system facilitates a computer system agent acting as a fiduciary agent for secure file storage on behalf of one or more of the parties or a combination of the parties.

13. The system of claim 1, wherein the one or more servers are configured to govern, under terms of the DSLC-VC, an exchange of one of a commodity and a trade credit based on the commodity.

14. The system of claim 1, wherein the system facilitates a mutual credit system whereby debits and credits are created using data events associated with the ISA.

15. The system of claim 1, wherein the system facilitates verified testing by a decentralized identifier (DID) of the first party being provided to a testing device, and by the testing device signing a record of test results using a DID of the testing device, and by the testing device sending the signed record to one of a computer system agent of the first party and a computer system agent of a third party.

16. The system of claim 1, wherein the system facilitates verified testing by a decentralized identifier (DID) of the first party being provided using a first of the communication devices, the system receiving through a second of the communication devices a signed record of test results associated with the DID of the first party, and the signed record being sent by the second of the communication devices to one of a computer system agent of the first party and a computer system agent of a third party.

17. A link contract method, comprising:
communicatively coupling one or more servers with two or more communication devices, the two or more communication devices configured to facilitate digital communications between a first party and a second party; and
using the one or more servers:
verifying one or more verifiable credentials (VCs) of one of the first party and the second party;
facilitating communication of a proposed link contract, that includes the one or more VCs, between the parties;
receiving digital signatures to the proposed link contract from the parties to generate a digitally signed link contract with the verifiable credentials (DSLC-VC), wherein the digital signatures are facilitated using private cryptographic keys;
generating a cryptographic hash of the DSLC-VC; and
providing the cryptographic hash and the digital signatures to the parties as proof of agreement to the DSLC-VC;
wherein the DSLC-VC is machine readable and comprises a human readable Information Sharing Agreement (ISA); and
wherein the one or more servers are configured to govern one of access to and usage of data of the first party under terms of the ISA.

18. The method of claim 17, wherein the DSLC-VC comprises a legal contract having terms that are automatically enforced using the one or more servers.

19. The method of claim 17, further comprising the one or more servers facilitating verifiable provenance of an online published item by assigning a globally unique identifier to the published item, by identifying a decentralized identifier (DID) associated with an original content producer of the published item, and by identifying a DID associated with each republisher, in sequence, of the published item.

20. The method of claim 19, wherein the one or more servers facilitate sponsorship-based publication and sponsorship identification of the online published item by: the DSLC-VC comprising an Information Sharing Agreement (ISA) between a sponsor pledging financial support for the online published item and one of the original content producer and one or more of the republishers of the online published item and; assigning a DID to the sponsor; and one of identifying the sponsor together with the online published item and providing a link with the online published item, the link navigating to a page identifying the sponsor; wherein the verifiable provenance facilitates distribution of sponsorship revenue among the original content producer and the one or more republishers.

21. The method of claim 19, wherein the one or more servers facilitate subscription of the online published item by: assigning a DID to each subscriber of an online platform or system, the online platform or system providing access to the online published item; wherein the verifiable provenance facilitates distribution of subscription revenue, from one or more of the subscribers, to one of the original content producer and one or more of the republishers.

22. The method of claim 19, wherein the one or more servers facilitate consumer-based payments and sponsorship by: assigning a DID to each consumer user of an online platform or system, the online platform or system providing access to a plurality of online published items; facilitating one or more Information Sharing Agreements (ISAs) between the consumer users and a plurality of sponsors; maintaining confidentiality of personally identifiable information (PII) of the consumer users under terms of the one or more ISAs; facilitating payment, from one of a sponsor and a pool funded at least in part by the sponsor, to a digital wallet of one of the consumer users in response to the consumer user viewing content of the sponsor; and facilitating payment from the digital wallet to one of a content producer and a republisher of one of the online published items in response to input preferences of the consumer user.

23. The method of claim 17, wherein the DSLC-VC is an Information Sharing Agreement (ISA) and wherein the one or more servers govern confidentiality of participants in an online group under terms of the ISA, the method further comprising the one or more servers generating a decentralized identifier (DID) for each participant and facilitating each participant sharing information and engaging in the group pseudonymously using its DID.

24. The method of claim 23, further comprising the one or more servers facilitating the formation of networks of online groups on an online platform or system, each network including a plurality of online groups, each online group having a DID assigned to it, the method further comprising the one or more servers managing a plurality of ISAs between and among the online groups and the networks, facilitating each online group belonging to one or more networks, and facilitating information sharing between groups.

25. The method of claim 17, further comprising facilitating voting or polling without revealing any personally identifiable information (PII) by: one or more computer system agents creating a voting or polling decentralized identifier (DID) for the first party; the one or more computer system agents creating one or more cryptographic hashes of attributes by which the first party is authenticated; and using these hashes as unique identifiers for the purpose of voting or polling.

26. A link contract method, comprising:
communicatively coupling one or more servers with two or more communication devices, the two or more communication devices configured to facilitate digital communications between a first party and a second party; and
using the one or more servers:
verifying one or more verifiable credentials (VCs) of one of the first party and the second party;
facilitating communication of a proposed link contract, that includes the one or more VCs, between computer system agents of the parties;
receiving digital signatures to the proposed link contract from the computer system agents of the parties to generate a digitally signed link contract with the verifiable credentials (DSLC-VC), wherein the digital signatures are facilitated using private cryptographic keys;
generating a cryptographic hash of the DSLC-VC;
providing the cryptographic hash and the digital signatures to the parties as proof of agreement to the DSLC-VC; and
each computer system agent creating one or more entries using one or more decentralized identifiers (DIDs) pointing to a public key of a key pair;
wherein the DSLC-VC is machine readable and human readable;
wherein the DSLC-VC is a legal contract comprising an Information Sharing Agreement (ISA), and wherein the one or more servers allow and govern, under terms of the ISA, one or more exchanges of data associated with the first party.

27. The method of claim 26, further comprising transmitting a copy of the DSLC-VC to an audit service and further comprising recording, for each of the one or more exchanges of data, a cryptographic hash signed by a transmitter and a receiver, wherein the DSLC-VC is expressed in JSON-LD.

* * * * *